United States Patent [19]
Grove et al.

[11] 3,790,123
[45] Feb. 5, 1974

[54] VALVE APPARATUS AND METHOD

[75] Inventors: Marvin H. Grove; Rodney A. Wailes, both of Houston, Tex.

[73] Assignees: M & J Valve Company; M & J Development Company, both of Houston, Tex.

[22] Filed: Apr. 17, 1972

[21] Appl. No.: 244,398

Related U.S. Application Data
[63] Continuation-in-part of Ser. No. 162,806, July 15, 1971, abandoned.

[52] U.S. Cl.................... 251/31, 251/62, 251/172, 251/289
[51] Int. Cl. ........................................... F16k 39/04
[58] Field of Search ........ 251/31, 62, 172, 173, 289

[56] References Cited
UNITED STATES PATENTS

| | | | |
|---|---|---|---|
| 2,802,483 | 8/1957 | Davis | 251/31 X |
| 2,918,085 | 12/1959 | Govan | 251/62 X |
| 2,998,220 | 8/1961 | Grieselhuber | 251/31 |
| 3,248,879 | 5/1966 | Natho | 251/31 X |
| 3,464,669 | 9/1969 | Henrion | 251/173 |
| 3,617,025 | 11/1971 | Gerbic | 251/172 |
| 3,635,436 | 1/1972 | Tillman | 251/31 |

*Primary Examiner*—Harold W. Weakley

[57] ABSTRACT

Valve apparatus and method using a valve (gate or ball type) which has one or more seat rings together with means for jacking the rings against the movable valve member. The jacking means is operatively connected to a loading device exterior of the valve body and arranged whereby the jacking force can be relieved to facilitate operation of the valve. Various embodiments are shown involving both manual and automated operation in conjunction with power means for operating the valve.

11 Claims, 7 Drawing Figures

VALVE APPARATUS AND METHOD

CROSS-REFERENCE TO COPENDING APPLICATION

This application is a continuation-in-part of our co-pending application Ser. No. 162,806 filed July 15, 1971 (now abandoned).

BACKGROUND OF THE INVENTION

Valves are frequently constructed with seat rings carried by the body and surrounding the flow passages. Springs are generally provided for urging the rings against the valve member, and this loading may be supplemented by providing a pressure area which is acted upon by pressure differential between the upstream side of the valve and the body space, whereby the upstream seat is urged by fluid pressure against the valve member. The seats are frequently provided with inserts of resilient material to establish an effective seal with the valve surfaces of the valve member.

Prior valves as described above may require excessive force to move between closed and open positions, particularly when the upstream pressure is sufficiently high to cause the upstream seat to be urged with considerable force against the valve member. If the pressure areas of the seat are designed to reduce such forces, then leakage may occur. Relatively high loading forces on the seat rings not only cause high operating forces, but in addition excessive wear and damage to the sealing means when the valve member is moved while such forces are acting on the seat rings. For lower operating pressures the loading on the seats may be insufficient to prevent some leakage.

In general, there is need for a valve which will provide adequate loading forces on the seat rings to maintain the desired seal under all operating conditions, while permitting easy operation of the valve without excessive operating forces and without undue wear or injury to the sealing means carried by the rings.

SUMMARY OF THE INVENTION

The present invention relates generally to valve apparatus and methods of the type used for controlling the flow of gases and liquids, and particularly to valves and methods that are applicable for use with relatively high line pressures.

In general, it is an object of the invention to provide a valve apparatus and method which will not require excessive forces to move the valve member between closed and open positions, but which will provide adequate loading forces on the seat ring or rings during normal operation to prevent leakage.

Another object of the invention is to provide a valve apparatus and method having seat ring loading means exterior of the valve body which can be actuated to relieve forces on the seat rings tending to urge them against the valve member.

Another object of the invention is to provide a valve apparatus and method having hydraulic means for normally applying jacking forces to one or more of the seat rings of the valve, and which has means exterior of the valve whereby pressure applied to the hydraulic fluid is relieved to facilitate valve operation.

Another object of the invention is to provide a valve apparatus and method which automatically reduces loading forces on one or more of the seat rings of the valve when power means connected to the valve for its operating is energized.

Another object of the invention is to provide valve apparatus and method which makes use of an operator of the double-acting hydraulic type, together with a hydraulic system including a control valve which is operated to actuate the operator to open and close the valve. Particularly, the invention coordinates the hydraulic system with jacking means for one or more of the seat rings of the valve, whereby loading forces on the seat rings are automatically relieved when the hydraulic system energizes the hydraulic operator.

Another object of the invention is to provide valve apparatus and method in means for applying loading force to the seat ring or rings of the valve is obtained in such a manner that such forces are largely independent of line conditions.

In general, the present invention makes use of a valve having a valve member within a body and movable between open and closed valve positions. The valve includes at least one seat ring carried by the body and surrounding one of the flow passages. The seat ring is provided with means adapted to be connected to a loading device exterior of the valve body which serves to apply jacking forces to the seat ring under normal operating conditions. When it is desired to move the valve member between its valve positions, the exterior device is actuated for the purpose of relieving the jacking forces on the seat ring, thus facilitating movement of the valve member.

Additional objects and features of the invention will appear from the following description in which the preferred embodiments have been set forth in detail in conjunction with the accompanying drawing.

DESCRIPTION OF THE PREFERRED EMBODIMENTS

Figure 1:
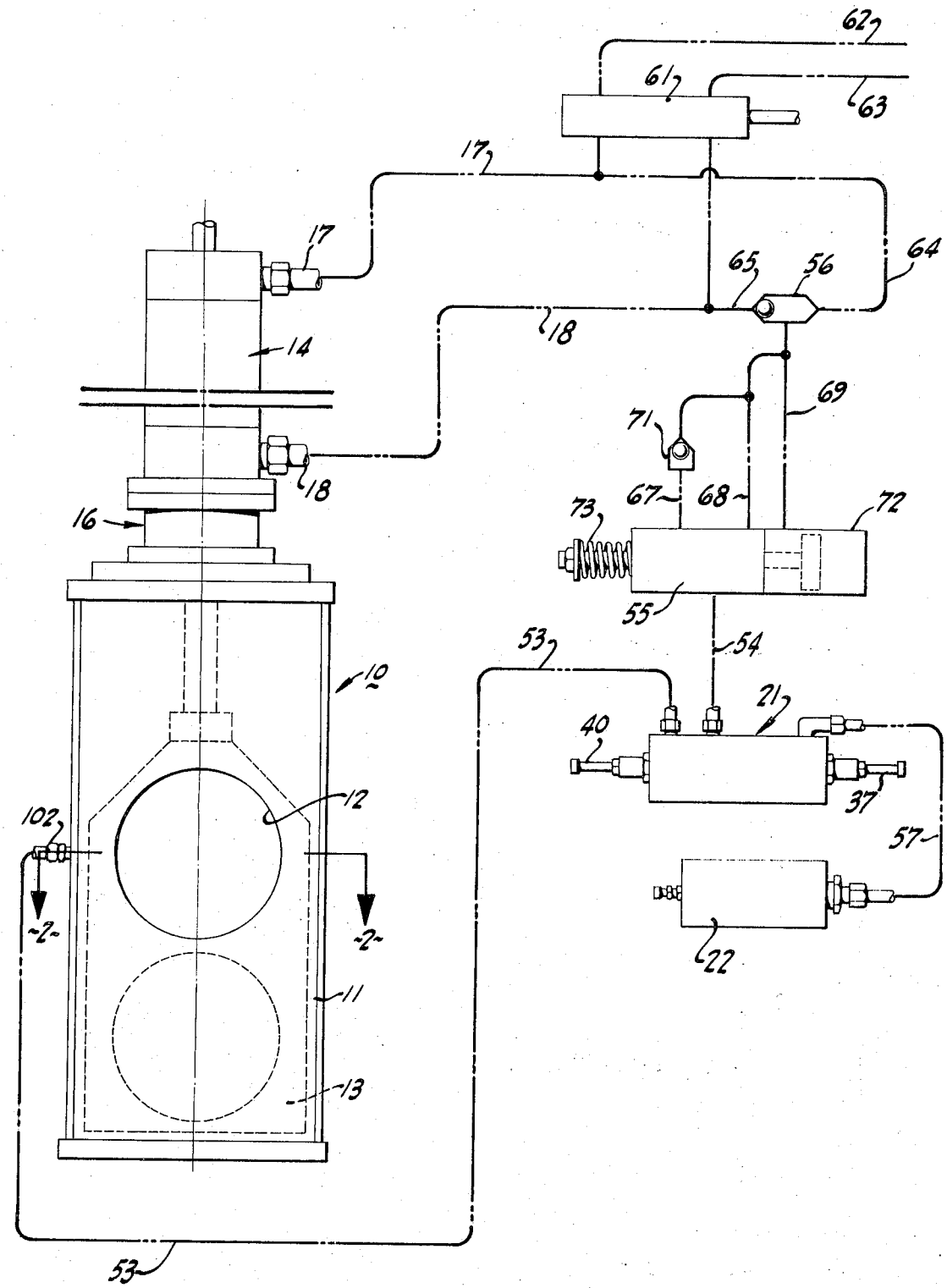
FIG. 1 illustrates a gate valve in end elevation, and in addition schematically illustrates a hydraulic system for operating the gage valve, together with a loading device serving to apply and relieve loading forces to the seat ring or rings of the valve.

The apparatus illustrated in FIG. 1 consists of a valve 10, in this instance one of the gate type, which includes the valve body 11 having aligned flow passages 12 in its end walls, and a valve gate 13 movable between full open and closed positions. The valve is shown equipped with a power operator 14 which in this instance is of the hydraulic type, such as a double-acting cylinder-piston assembly. The operator is directly mounted upon a bonnet assembly 16 which in turn is carried by the upper end of the valve body. The hydraulic pipe connections 17 and 18 to the end portions of the hydraulic cylinder are shown connected to a hydraulic system which serves to supply liquid under pressure to one or the other of the pipes 17 and 18.

The apparatus of FIG. 1 also includes the special hydro-pneumatic loading device 21 and the accumulator 22 which represents a source of fluid under pressure. Such accumulators generally consist of a pressure vessel containing gas (e.g., nitrogen) under pressure and a hydraulic fluid, the gas and fluid being separated by a sealed free floating piston or elastic diaphragm.

Figure 5:
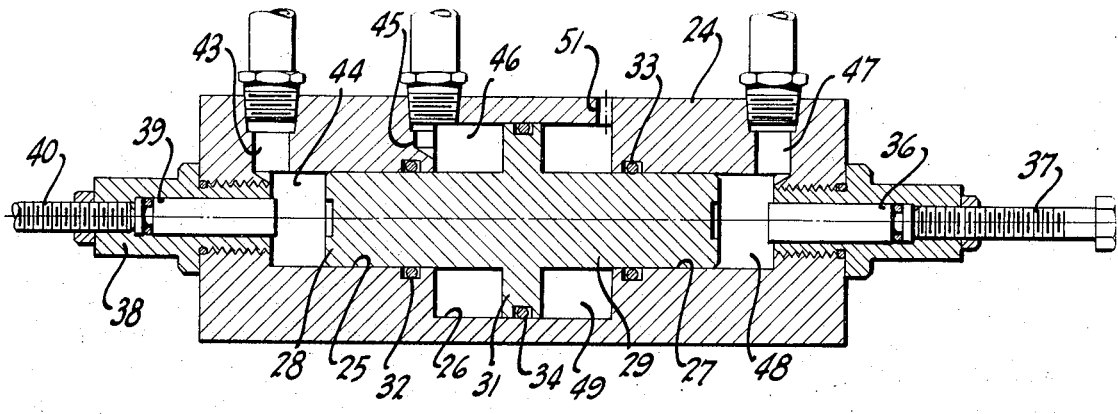
FIG. 5 is a view in section showing the construction of the loading device 21 of FIG. 1.

Device 21 can be constructed as shown in section in FIG. 5. It consists of a body 24 which is formed to provide the aligned cylindrical bores 25, 26 and 27. The connected plungers 28 and 29 are fitted within the bores 25 and 27, and a somewhat larger piston 31 carried by the plungers 28 and 29 is fitted within the bore 26. Suitable sealing means is provided for the plungers and piston, as for example, sealing means of the O-ring type 32 and 33 for the plungers 28 and 29, and means 34 for the piston 31.

Suitable means can be provided at the ends of the body 24 for locking the plungers in a given position. Thus, at the right-hand end shown in FIG. 5, the body is provided with a fitting 35 which is bored to receive the rod 36 and threaded to receive the screw 37. Rod 36 is sealed with respect to fitting 35 as by an O-ring. The other end of the body 24 is similarly provided with fitting 38, rod 39 and threaded screw 40.

The body 24 is also provided with a number of ports for making external connections as follows. A port 43 communicates with the space 44 within the cylindrical bore 25. A port 45 communicates with the space 46 within the cylindrical bore 26 and on the left-hand side of the piston 31. A port 47 communicates with the space 48 within the cylindrical bore 27. The space 49 on the right hand side of the piston 31 may be vented to the atmosphere through duct 51 or breather hole.

The hydraulic connections between the device 21 and the other parts of the apparatus are as follows. The port 43 is connected by pipe 53 with one side of the valve 10, as shown in FIG. 1. As will be presently explained, this connection communicates with a hydraulic chamber associated with at least one of the seat rings of the valve. The port 45 is connected by pipe 54 and valve means 55 with what may be termed a shuttle check valve 56. The port 47 is connected by pipe 57 with the pressure tank or flask 22.

Assuming that hydraulic fluid is contained in the space 44 and in the pipe 53 leading to the valve 10, and the tank 22 contains gas and hydraulic fluid at a pressure of, say, 500 p.s.i., then it will be apparent that this pressure is applied to the space 48, thus urging the plungers 28 and 29 toward the left as viewed in FIG. 5. This serves to apply a corresponding pressure to the fluid in pipe 53. Assuming that fluid pressure is applied to the space 46 to the left of piston 31 through pipe 54, then piston 31, together with the plungers 28 and 29, is urged to the right as viewed in FIG. 5, thus relieving the pressure of liquid in pipe 53.

In the apparatus of FIG. 1, fluid pressure is applied from the hydraulic system through pipe 54 when fluid pressure is applied to the hydraulic operator 14 for operation of the valve. The hydraulic fluid system schematically illustrated in FIG. 1 consists of a four-way control valve 61 which connects to pipe 62 that supplies fluid under pressure, and pipe 63 through which liquid is exhausted. Preferably, valve 61 is so constructed that its operating member is spring biased to an intermediate normal position. Pipes 17 and 18 leading from the cylinder of the hydraulic operator 14 make direct connection with ports of the four-way valve 61.

The shuttle check valve 56 as schematically illustrated consists of two spaced seats nd a single check ball. Pipes 64 and 65 connect the seat ports with the pipes 17 and 18. The valve means 55 as schematically illustrated is of the three-way pressure operated type. Pipe 54 connects with one port of the three-way valve, and the other two ports connect with pipes 67 and 68. Pipe 68 connects directly with pipe 69, which in turn connects with the shuttle check 56 at a point between the seats. Pipe 67 includes a check valve 71 which allows flow from shuttle valve 56 to the three-way valve 55 but prevents flow in the reverse direction.

A fluid pressure operator 72 has its piston or other fluid pressure operating member connected to the operating member of the three-way valve 55. Also, valve 55 is normally biased to one of its two operating positions as by a spring 73. The position to which it is spring biased is such that pipes 68 and 54 are placed in communication. When operator 72 is actuated by application of fluid pressure, valve 55 is moved to its other operating position in which pipes 67 and 54 are in communication.

Figure 2:
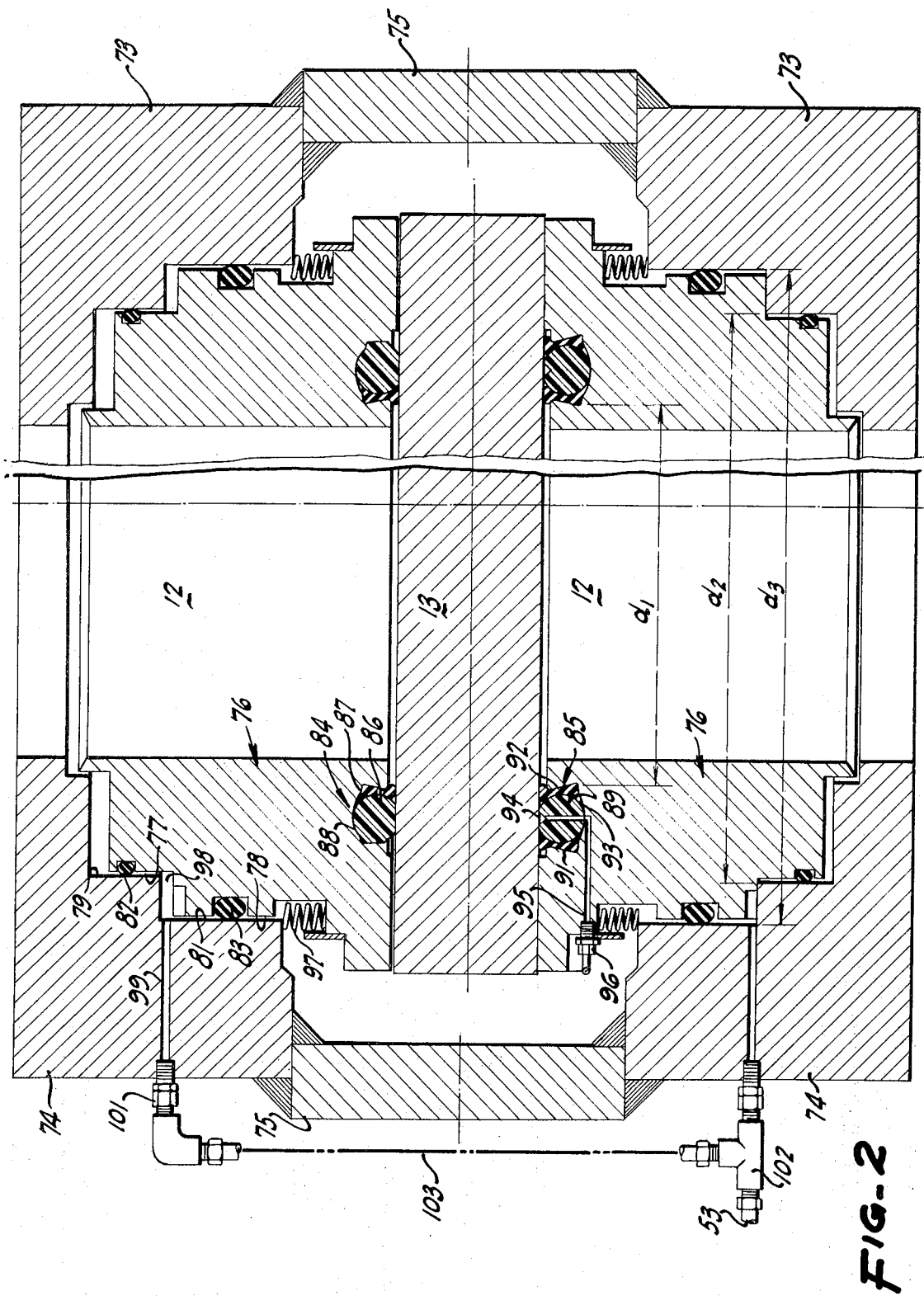
FIG. 2 is a cross-sectional view taken along the line 2—2 of FIG. 1.
Figure 3:
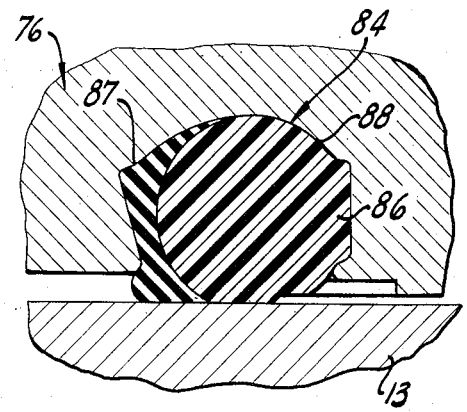
FIG. 3 is an enlarged detail in section illustrating the construction of one of the resilient seal means.
Figure 4:
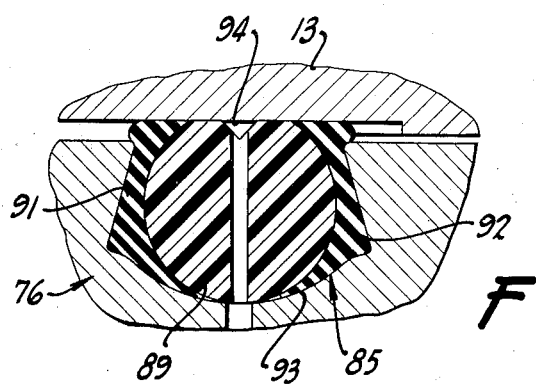
FIG. 4 is an enlarged detail in section like FIG. 3, but showing another type of sealing means.

FIG. 2 illustrates a suitable type of valve sealing means which can be used with the apparatus. In this instance the end walls 74 of the valve body, which are welded to the side walls 75, are bored to accommodate the seat rings 76. These rings surround the aligned flow passages 12. The seat rings have stepped diameters 77 and 78 which are fitted within the cylindrical bores 79 and 81 that are machined in the end walls 73. Each seat ring is sealed with respect to the body by the seat rings 82 and 83 of the resilient O-ring type. The end face of each seat ring 76, which is adjacent the gate 13, is provided with sealing assemblies 84 and 85 which may be similar in construction, or somewhat different as illustrated. Assembly 84 is similar to that disclosed and claimed in copending application Ser. No. 17,365, filed Mar. 9, 1970. Briefly, it consists of an annular member 86 together with a more resilient member 87 made of suitable material such as synthetic rubber or elastomer. These parts are fitted within the annular recess 88 in the seat ring 76, whereby the annular member 87 is in radial compression and has its edge face in sealing engagement with the adjacent valve surface of the gate 13.

The assembly 85 as illustrated in FIG. 2 is likewise disclosed in said copending application Ser. No. 17,365. It consists of an annular member 89 made of suitable non-metallic material like nylon, together with two annular members 91 and 92 which are made of more resilient material such as synthetic rubber or elastomer. These parts are disposed within the annular recess 93 with the resilient members 91 and 92 in radial compression. The edge faces of members 91 and 92 engage and form seals with respect to the adjacent surface of gate 13. The sealed off space 94 between the concentric areas of sealing contact between members 91 and 92, and the gate 13 is shown connected by duct 95 to a fitting 96, which in turn may be connected to a fitting on the exterior of the valve body. Such an arrangement can be used to determine if the sealing assembly 85 is leaking. Thus, if duct 95 is vented to the atmosphere and then closed at the exterior of the valve, a build-up of pressure will indicate leakage past one or the other of the resilient members 91 or 92.

A plurality of circumferentially disposed compression springs 97 are provided to apply a nominal loading force to each of the seat rings, thereby urging these rings against the gate 13. The closed annular chambers 98 provided between the resilient O-rings 82 and 83 for each seat ring communicates with a duct 99 that connects to exterior fittings 101 and 102. In some instances, one or the other of these fittings may be separately connected to the pipe 53, but generally they are connected together as by pipe 103 and thence to the pipe 53. In other words, application of fluid under pressure to pipe 53 serves to apply the fluid to both of the annular chambers 98.

It will be apparent that application of fluid under pressure to the chambers 98 of the seat rings serves to load or hydraulically jack these rings against the gate, the jacking forces being proportionate to the applied fluid pressure. The jacking force can be such that the resilient sealing assemblies 84 and 85 are compressed to the point of direct metal-to-metal contact between the seat rings and the gate.

While the particular sealing means described above is effective, other types of sealing assemblies can be used which have provision for applying fluid pressure to one or both of the assemblies to cause metal seat rings to be tightly clamped against the valve member.

Operation of the apparatus shown in FIG. 1 is as follows. Normally, the fluid pressure in pipe 53 is maintained at a value sufficient to hydraulically load or jack the seat rings 76 with the desired force against the gate 13. This fluid pressure is maintained by the plunger 28 and by the plunger 29 which urges plunger 28 toward the left as viewed in FIG. 5 under the urge of fluid pressure loading from the accumulator 22.

Assuming that the jacking forces are sufficiently high to effect metal-to-metal contact between the seat rings and the gate, the gate is held firmly by the seat rings, and relatively high forces would be required to move the gate from one position to another. Assuming that the gate is thus locked in open position and it is desired to close the valve, the four-way control valve 61 is moved from its normal neutral position to a position in which hydraulic fluid is supplied under pressure to pipe 17, and to exhaust fluid through the control valve from pipe 18. As hydraulic fluid is first applied to pipe 17, initial pressure developed which is applied through pipe 64 to shuttle valve 56 whereby the latter's valve member is urged against its left hand seat and fluid pressure is applied through pipe 69 to the operator 72. This operator is thus energized to operate valve 55 against the urge of spring 73 whereby pipe lines 67 and 54 are placed in communication to cause fluid pressure to be applied to the space 46 on the left hand side of piston 31. The force thus acting upon piston 31 is in opposition to the loading plunger 29 and the force applied urging piston 31 to the right may be about equal to or slightly greater than the loading applied to the plunger 29 by virtue of fluid under pressure in chamber 48. Thus, before the hydraulic operator 14 has moved the gate, the hydraulic pressure applied to the seat rings is relieved, and the jacking or loading forces urging these seat rings against the gate greatly reduced or completely relieved, thus freeing the gate for movement. Thereafter the operator 14 continues to move the gate to the close position. When this position is reached, control valve 61 is returned to its neutral position in which lines 17 and 18 are both connected through the control valve with the exhaust line 63. Fluid from space 46 may now vent through pipe 54, three-way valve 55, pipe 68, shuttle valve 56, pipe 64 and control valve 61; thus the loading in space 48 is again effective to apply fluid pressure through pipe 53 to lock the gate.

Assuming now that it is desired to return the gate to its first or open position, then the four-way valve 61 is again operated from its neutral position to supply fluid under pressure to pipe 18, with fluid being exhausted through pipe 17. Again, the initial pressure applied to pipe 18 is transmitted through shuttle valve 56, three-way valve 55 and pipe 54, with the result that this liquid pressure is applied to space 46 of device 21 to again urge the piston 31 toward the right as viewed in FIG. 5. Thus, the jacking forces upon the seat rings are again relieved before the gate is moved and during movement back to open position.

If during a cycle of operation control valve 61 is moved to neutral position to stop the gate in an intermediate position, fluid is again vented through pipe 54 to apply locking pressure through pipe 53.

In some instances it is desirable to lock the plungers 28 and 29 in one position, whereby hydraulic loading pressure is either maintained in line 53, or application of jacking pressure is prevented. Thus, by manipulation of the screw 40 shown on the left hand end of the body 24 in FIG. 5, the screw 40 can be advanced to cause rod 39 to engage the end of the plunger 28, thus preventing movement of this plunger in a direction to apply pressure to liquid in pipe 53, or moving the plunger a short distance to relieve pressure in pipe 53. Likewise, if it is desired to retain loading pressure in pipe 53, screw 37 is advanced to cause rod 36 to engage the plunger 29 and urge this plunger with sufficient force toward the left that it applies the requisite pressure to the pipe 53. When the screw 38 is advanced as just described, the maintenance of hydraulic jacking pressure in pipe 53 is independent of hydraulic loading by way of accumulator 22.

The apparatus described above in connection with FIG. 1 is also suitable for use where a central hydraulic system is arranged to operate a plurality of valve operators. In such event, one pressure tank may serve all of the valves. Each valve, however, will be provided with its individual control valve, three-way valve 55 and load controlling device 21.

Figure 6:
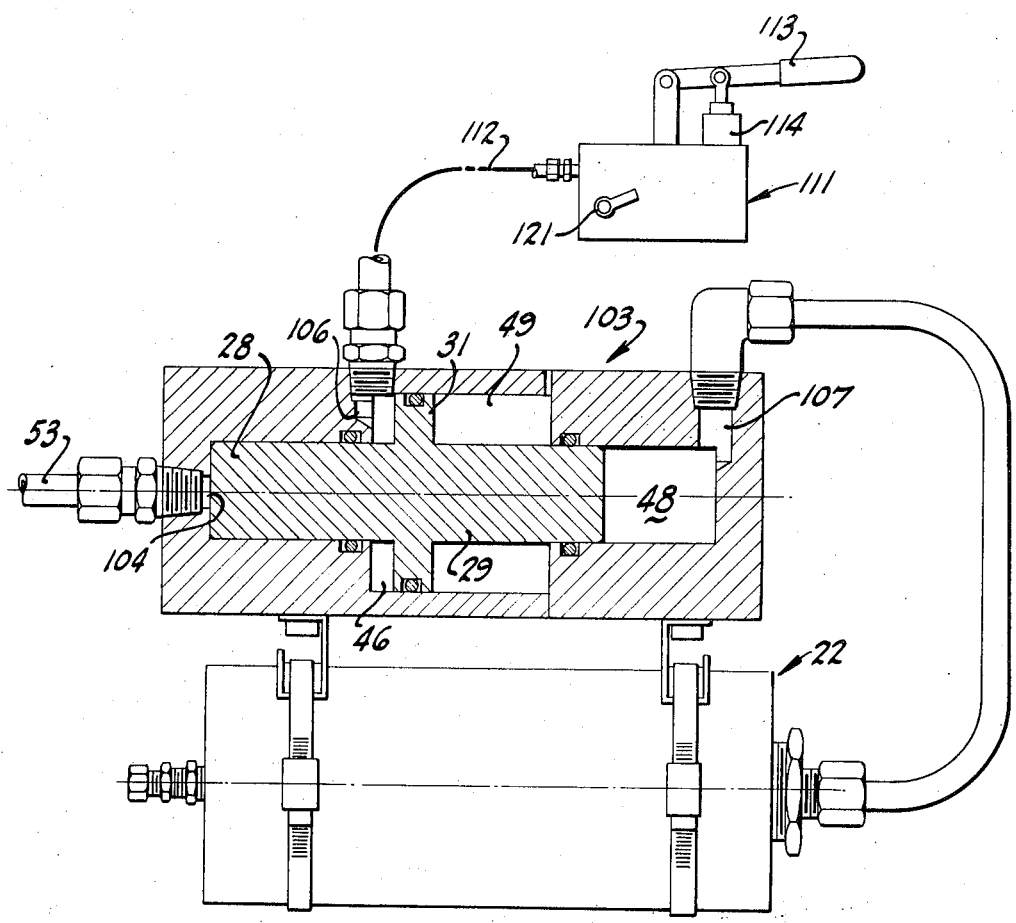
FIG. 6 illustrates a further embodiment of the invention in which a hand pump is employed.

A further simplified apparatus has been illustrated in FIG. 6. In this instance, the load controlling device 103 is the same as in FIG. 5. However, a hand-operated hydraulic pump 111 has been substituted for connection to the hydraulic operating system. The pump is shown having its pressure pipe 112 directly connected to the port 106. It has a hand operating lever 113 and a cylinder 114 for developing the desired pressure in the pipe 112. A pump schematic is shown in FIG. 8. The pump intake check valve 116 is located within the liquid reservoir 117. The bypass device 118 likewise located in the reservoir serves to limit the developed discharge pressure. Check valve 119 serves to lock the pressure in the line 112. Manually operated valve 121, likewise indicated in FIG. 7, may be operated to relieve the pressure in line 112.

Figure 7:
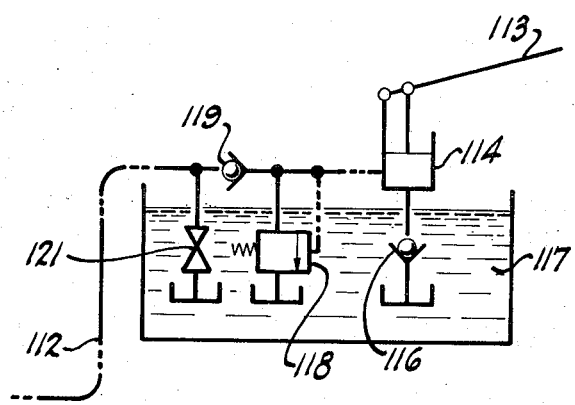
FIG. 7 is a schematic diagram illustrating the component parts of the pump shown in FIG. 7.

It will be evident that with the apparatus shown in FIG. 7, and assuming that the pipe 53 is connected to a valve in the same manner as in FIG. 1, the plunger assembly normally will maintain pressure within line 53 to retain the seat rings tightly pressed against the valve member. However, when it is desired to relieve the jacking forces on the seat rings, the hand pump 111 is operated to develop pressure in line 112, whereby this pressure acting upon the piston 31 serves to relieve the pressure in line 53, thus releasing the seat rings.

We claim:

1. In valve apparatus, a valve body having aligned flow passages, a valve member within the body and movable between open and closed positions relative to the flow passages, at least one seat ring movably carried by the body and surrounding one of the flow passages, means adapted to receive hydraulic fluid under pressure for jacking the ring against the valve member, a loading device exterior of the valve member comprising a body, a cylinder formed in the body, a plunger fitted in the cylinder, the cylinder being adapted to contain hydraulic fluid, a fluid connection between said cylinder and the first named means, loading means for yieldably urging the plunger in a direction to apply hydraulic fluid under pressure to the first means, and controllable means for opposing the urge of said last named means.

2. The valve apparatus as in claim 1 in which said loading means consists of a second cylinder, a second plunger fitted in the second cylinder, the second plunger being mechanically connected to the first named plunger, and a source of fluid pressure connected to the second cylinder to urge the second plunger in a direction to urge the first named plunger against the hydraulic fluid.

3. Apparatus as in claim 1 together with mechanical means for locking the plunger in a desired position.

4. Apparatus as in claim 1 together with power means adapted to be energized for moving the valve member between open and closed positions, and means responsive to energization of said power means for opposing the urge of said loading means.

5. Apparatus as in claim 4 in which said power means is of the hydraulic cylinder-piston type together with a hydraulic system for supplying and exhausting fluid from the operator, and in which the means for opposing the urge of said loading means includes hydraulic actuating means mechanically connected to the first named plunger and means forming a fluid connection between said hydraulic actuating means and the hydraulic system whereby when the power operator is hydraulically energized to move the valve member between open and closed positions, hydraulic fluid is supplied to said hydraulic operator to oppose the urge of said loading means.

6. In valve apparatus, a valve body having aligned flow passages, a valve member within the body and movable between open and closed positions relative to the flow passages, at least one seat ring movably carried by the body and surrounding one of the flow passages, means adapted to receive hydraulic fluid under pressure for jacking the ring against the valve member, and a device exterior of the valve member comprising a body, a first cylinder formed in the body, a first plunger fitted in the cylinder, the cylinder being adapted to contain hydraulic fluid, a fluid connection between said cylinder and the first named means, said device also including a second cylinder, a second plunger fitted within the second cylinder and directly connected to the first plunger, the second cylinder being adapted to have fluid connection with a source of fluid under pressure to apply loading force to both of the plungers, a third cylinder formed within the body of said device, a piston fitted in the third cylinder and directly connected with said plungers, said third cylinder being adapted to be connected with a controllable source of fluid under pressure whereby fluid under pressure applied to said third cylinder opposes the loading force applied to said plungers.

7. Apparatus as in claim 6 together with mechanical means for locking the plungers in a desired position.

8. Valve apparatus as in claim 6 together with a power operator adapted to be energized to move the valve member between closed and open positions, and means for supplying fluid under pressure to said third cylinder when said power operator is energized.

9. Valve apparatus as in claim 6 together with a hydraulic power operator of the cylinder-piston type adapted to be energized by application of hydraulic fluid under pressure to move the valve member between closed and open positions, a hydraulic system connected with said operator and adapted to supply and exhaust hydraulic fluid from the same, said system including a control valve adapted to be moved between operating positions whereby the operator is caused to move the valve member between closed and open positions, and means forming a fluid connection between said third cylinder and said hydraulic system whereby when said system is controlled to cause the hydraulic operator to be energized, fluid pressure is applied to said third cylinder to oppose the urge of said loading means.

10. Apparatus as in claim 9 together with means for limiting the maximum pressure of hydraulic fluid supplied to said third cylinder.

11. Apparatus as in claim 9 in which said last means includes a three way valve and pressure operated means for positioning said valve, said valve serving to permit fluid pressure from the hydraulic system to be applied to said third system or vented from the same.

* * * * *